(12) United States Patent
Collette

(10) Patent No.: US 7,479,170 B1
(45) Date of Patent: Jan. 20, 2009

(54) MODULAR UP-DRAFT PRESSURE PULSE BAG HOUSE

(76) Inventor: Jerry R. Collette, 1251 E. 279th Street, Unit J, Euclid, OH (US) 44132

( * ) Notice: Subject to any disclaimer, the term of this patent is extended or adjusted under 35 U.S.C. 154(b) by 498 days.

(21) Appl. No.: 11/214,749

(22) Filed: Aug. 31, 2005

Related U.S. Application Data

(60) Provisional application No. 60/606,133, filed on Sep. 1, 2004.

(51) Int. Cl.
B01D 46/00 (2006.01)
B01D 29/66 (2006.01)
(52) U.S. Cl. .............................. 55/302; 55/283; 55/284; 55/293; 95/280; 96/426; 96/427
(58) Field of Classification Search ................... 55/283, 55/284, 302, 293; 95/280; 96/426, 427
See application file for complete search history.

(56) References Cited

U.S. PATENT DOCUMENTS

| | | | | |
|---|---|---|---|---|
| 4,681,604 A * | 7/1987 | Niederer | ...................... | 95/282 |
| 4,778,491 A * | 10/1988 | Yow, Sr. | ........................ | 95/26 |
| 5,788,746 A * | 8/1998 | Bartling | ........................ | 95/268 |
| 6,309,447 B1 * | 10/2001 | Felix | ............................ | 95/280 |
| 6,605,139 B2 * | 8/2003 | Felix | ............................ | 95/280 |
| 6,890,365 B2 * | 5/2005 | Prill | ............................. | 55/302 |
| 7,300,481 B2 * | 11/2007 | Scheuch | ...................... | 55/302 |
| 2004/0020365 A1 * | 2/2004 | Hansen et al. | ................ | 95/280 |

* cited by examiner

*Primary Examiner*—Jason M Greene
*Assistant Examiner*—Minh-Chau T Pham
(74) *Attorney, Agent, or Firm*—James Creighton Wray; Clifford D. Hyra

(57) ABSTRACT

A bag house air filtration system with minimal recirculation uses new inlet airflow patterns and cleaning processes. Inlet air enters the bag house. An input plenum changes the velocity profile. Dirty inlet air is split into two plenums, and then passed through guide vanes. A clean air plenum contains a series of individual compartments with a pre-set number of filter bags that are effectively cleaned during a single cleaning cycle. Each individual compartment has a door or louver mounted above the bag openings that is opened and closed during the cleaning cycle. An automatic control system continuously senses bag house pressure drop and activates the cycle when needed. The doors open and close in a pre-set pattern to drop the dust cakes from the bags and restore air flow to normal pressures. Closing a door mounted above the bags creates a reversal of pressure that removes the dust cake.

20 Claims, 10 Drawing Sheets

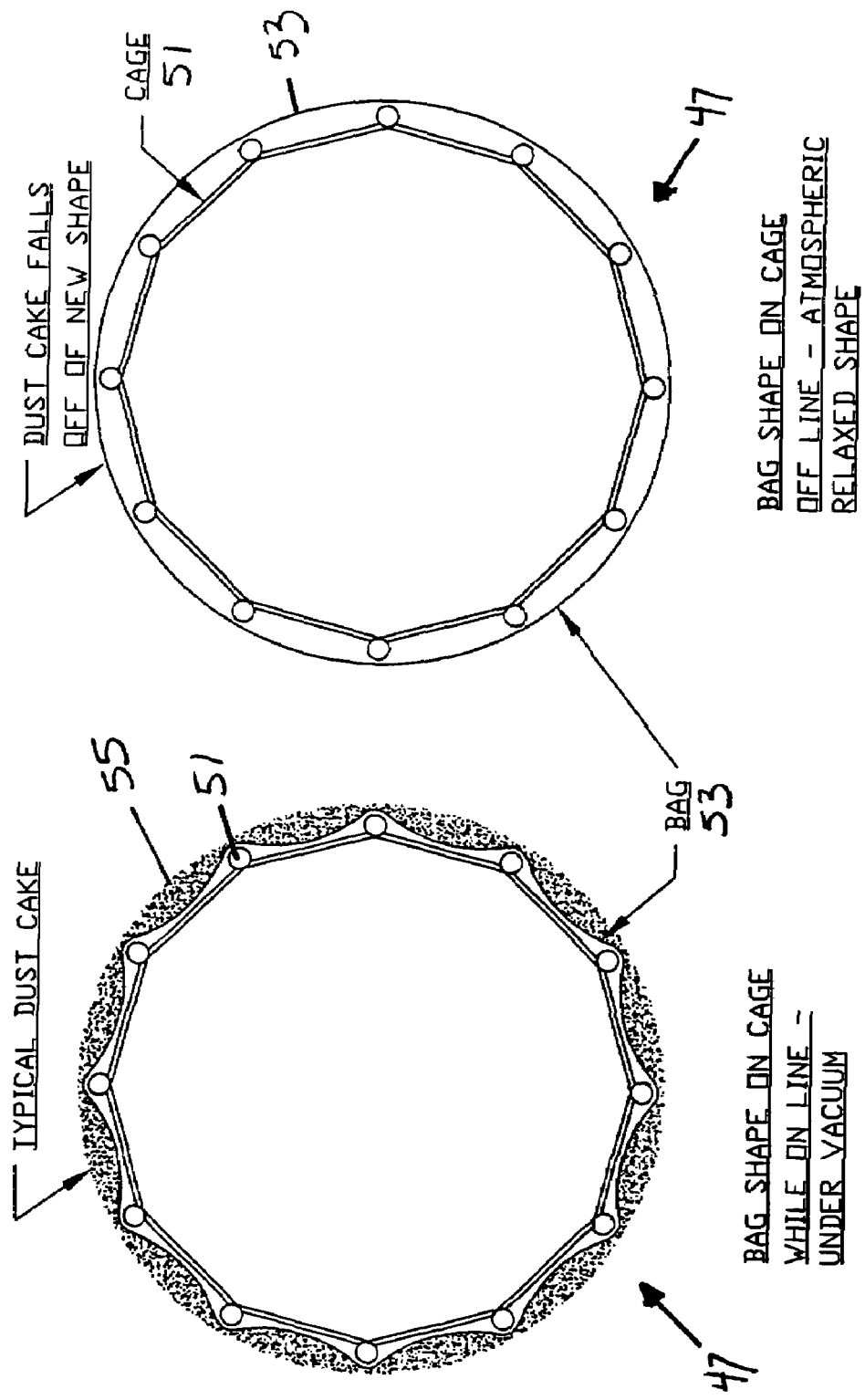

MODULAR UP-DRAFT PRESSURE PULSE BAG HOUSE

This application claims the benefit of U.S. Provisional Application No. 60/606,133, filed Sep. 1, 2004, which is hereby incorporated by reference in its entirety.

BACKGROUND OF THE INVENTION

The present invention relates to the effective capture and removal of particulate material from dust laden air streams that must exit to atmosphere from many different process systems. Process systems include such varied applications as power plants, process kilns, cement plants, grain processing plants, foundries, steel mills, hot mix asphalt plants and many other industrial processes.

It is generally known and accepted throughout these industries that fabric filter collection systems ("bag houses") provide the most economical and efficient "dry method" of removing small particulate material from process air streams. EPA air emissions laws governing the amount of particulate emissions allowed to exit into the atmosphere from any given process are now generally standardized throughout the United States and Canada. Additionally, these laws have remained reasonably stable for the past several years. The current accepted emissions level for particulate material permitted to atmosphere is "0.04 grains per dry standard cubic foot of exhaust air". This law is commonly referenced by EPA agencies as 0.04 gdscf. In order to achieve an atmospheric loading of 0.04 gdscf or less, it is usually necessary to utilize fabric filters and achieve a cleaning efficiency of 0.99895% or greater.

Bag houses are manufactured in many sizes and configurations. Bag houses are typically available in "portable mode" or "stationary mode". A portable bag house is limited in size by the availability of permits and the ability to transport the bag house on a highway. In contrast, stationary units are offered in almost any size with sections assembled on site to accommodate a specific process.

A standard bag house consists of a vessel, generally a rectangular container, having a dirty air inlet on one end leading into a lower dirty air section with a clean air outlet on the other end leading from an upper clean air section. Incoming dirty air must pass thorough the bag cloth in order to reach the clean air outlet.

A typical bag house contains a multitude of woven fabric bags that can be of varying types and sizes (typically 6" diameter×12'0" long). The filter bags are generally hung or mounted on a bag tube sheet by a snap band collar at the open end of the bag which fits tightly into holes in the tube sheet at the top of the bag section, thus providing air tight seals. Each fabric membrane bag is fitted over a separate wire cage or extruded cage. The cages provide support for the bag filter that allows the bag filter to remain open and to assume a specific shape during cleaning operations.

As the dirty air passes through the filter bags, particulate material from the dirty air stream is left on the outside of the cloth surface. As the dust accumulates and a dust cake forms on the outside of the bag, the dust cake becomes the actual filtration membrane. As the dust cake thickness increases, the airflow resistance through the filter media also increases. When a certain level of pressure drop (delta P resistance) is reached, the dust cake must be reduced in order to restore adequate airflow to the system.

There are a number of accepted cleaning methods used to "drop" the dust cake. These cleaning methods include compressed air pulse, vibration, shaking, reverse air blowing, and atmospheric venting. The most commonly used of these cleaning methods is the compressed air pulse method. In this method, a momentary burst of high-pressure compressed air is forced down into the throat of each bag, sending a shock wave down the length of the bag that dislodges the dust cake. The dust that is removed from the outer bag surface drops by gravity to a hopper collection area in the bottom of the bag house. The accumulated dust is then typically removed by a screw auger system.

Despite the widespread use of traditional bag houses, the science of particulate collection still suffers from shortcomings. During the operation of a typical bag house, cleaned air is inadvertently recycled through the system. Generally, air from the filter bags nearest the dirty air inlet flows in the correct direction. However, when the clean air from the bags closest to the dirty air inlet passes over the filter bags near the clean air outlet of the system, some of the clean air is drawn back down into the filter bags and passes through the filter bags in the wrong direction. This creates a re-circulation problem that reduces the efficiency of the bag house.

It has been determined that current methods of bag house design, as well as current methods of bag cleaning, are grossly inefficient. Additionally, in some iristances the inefficiencies in bag house design and bag cleaning can lead to negative air effects that actually contribute to air emissions. Research by experts in the areas of computational fluid dynamics (CFD), as well as fluid dynamics, heat transfer, thermodynamics, and aerodynamics has confirmed these inefficiencies.

Computational fluid dynamics (CFD) is concerned with obtaining numerical solutions to fluid flow problems by using computers. Equations governing the fluid flow problem include conservation of mass, Navier-Stokes (conservation of momentum), and the energy equation. These equations form a system of coupled non-linear partial differential equations (PDEs). Because of the non-linear terms in these PDEs, analytic methods can yield very few solutions. In general, closed form analytic solutions are possible only if these PDEs can be made linear, either because non-linear terms naturally drop out (e.g., fully developed flows in ducts and flows that are inviscid and irrotational everywhere) or because nonlinear terms are small compared to other terms so that they can be neglected (e.g., creeping flows, small amplitude sloshing of liquid, etc.). If the non-linearities in the governing PDEs cannot be neglected, which is the situation for most engineering flows, and then numerical methods are needed to obtain solutions. With CFD the differential equations governing the fluid flow are replaced with a set of algebraic equations. This process is called discretization. Once the equations are discretized they can be solved with a digital computer to get an approximate solution.

The discretized equations are solved on a computational grid. The equations are parallelized using a Message Passing Interface (MPI) technique that allows the computational grid to be divided up onto different computers. The computers work together to solve the equations simultaneously, greatly decreasing the time required to achieve a solution. This technique was used to model the fluid flow inside of bag houses. The computer modeling was conducted over a period of 45 days using 64 computers. The computational grid consisted of 2 million grid points that corresponds to 12 million equations. Several overall designs and different types of inlet and outlet locations and orientations were tested.

Research discovered that an internal re-circulation phenomenon was present in all tested, existing bag house designs. The re-circulation phenomenon is related to the flow patterns in the bag house. The modeling showed that the direction of flow through the bags depend on their location in the bag house. For bags that are far from the clean air plenum outlet the air flows in an upward direction, the correct direction for filtering. However, in bags that are near the clean air plenum outlet the air moves in a reversed direction that prevents the bag from filtering. This also indicates that the air involved in the re-circulation phenomenon becomes re-contaminated and must again be cleaned in order to exit the unit to atmosphere.

The discovery of the re-circulation phenomenon tells us that current bag houses must be grossly oversized (4.0 to 1.0 air to cloth ratio) to compensate for the number of bags that are engaged in negative re-circulation. These bags do not contribute to the filtration process and can therefore only reduce bag house overall capacity while reverse flowing rather than online cleaning. There is also considerable evidence that the re-circulation phenomenon allows very fine dust that continuously migrates through micro pores of the filter cake to accumulate inside the bags during re-circulation. Then, this fine dust is lifted and emitted in periodic bursts to the atmosphere when disturbed by the shock pulse jet air cleaning cycle. These periodic bursts of fine dust during bag house stack tests can result in failure to pass the particulate loading and opacity air tests. This problem is relatively common with pulse jet type cleaning systems. The reverse flow of re-circulating cleaned air back into the interior of the bags is actually caused by a combination of the imbalance of vacuum exerted on the exit air plenum (vacuum influence by exhaust fan) and the internal bag section vortex vacuum influence generated inside of the dirty air entry plenum. The flow field in the bag house is complex and highly three-dimensional.

In the hopper region below the bags high air velocity can create strong vortices that influence the flow pattern through the bags. These vortices can create low-pressure regions below the bags that overcome the vacuum influence of the clean air plenum. This in turn can cause reverse flow through the bags. It is also reasonable to assume that the reverse flow phenomenon moves around the bag house and will change from bag to bag as the resistance changes due to dust cake loading and cleaning. The re-circulation phenomenon is further influenced by the relative position and configuration of inlet and outlet plenums and how they affect internal air flows, as well as the location, size and orientation of inlet blast plates.

Needs exist for bag houses that eliminate the re-circulation problem and allow for maximum air cleansing potential and effective removal of dust cakes.

SUMMARY OF THE INVENTION

The present invention is a design and method of construction and operation for a modular bag house structure with unique bolt on inlet and outlet face sections. Both dirty air inlet and clean air outlet plenum designs affect internal airflow characteristics, as well as the functionality of the up-draft pressure pulse bag cleaning method. Overall house filter capacity is determined by the number of modules used. The modules are identical in size and are fully interchangeable. Only inlet and outlet face plates may be altered if necessary to conform to certain field conditions. Filter house sizes may be altered in the field by simply adding or subtracting the number of modules per house.

A primary object of the present invention is to improve upon the efficiency of currently accepted designs of bag house vessels regarding internal airflows, and to improve upon the effectiveness and efficiency of bag cleaning science. The present invention creates an airflow pattern in the bag house with a more stable velocity pattern. Inlet air enters the bag house and is initially subject to gravity removal of large particulate matter. This large particulate matter is directly guided to the hopper section of the apparatus. After heavy particulate has been initially filtered, the dirty inlet air is split into two plenums on either side of the house. This divided air is then passed through guide vanes that create favorable velocity profiles for entering the bag chamber. The change in velocity profile creates a more stable airflow through the bag section of the house.

The overall bag house structure must be altered in order to provide for more effective straight line air movements within each chamber of the bag house. In order to first eliminate internal turbulence and stabilize pressures and flow pathways, it is necessary to design dirty air inlets to "straighten the air" and distribute the volume evenly throughout the hopper and bag section of the house, eliminating turbulence and vortices. By entering at the center of a large (frontal entry) distribution chamber, inlet air is directed to both right and left sides of the bag house splitting the flow volume and allowing it to be evenly directed down and under the bags. A large inlet plenum stabilizes inlet air pressure and also acts as a "primary knock out box collector" to capture and eliminate larger sized dust particulates from the air stream and deposit the material directly into the hopper. Removing large particulates from the air stream prior to entering the bag section helps to reduce abrasive wear and increases bag life considerably. After the dirty air stabilizes within the hopper and bag section, it is evenly vacuumed up through the bags in a continuous vertical plane into the clean air plenum.

With the new pressure pulse cleaning in up-draft bag houses, there is no recirculation occurring within any section of the bag house. One hundred percent of the dirty air entering the hopper and bag section of the house is drawn through the bag filters and exits through the clean air plenum with no downward recirculation of air.

The present invention also incorporates a method referred to as "up-draft bag house pressure pulse" cleaning. The use of the novel up-draft pressure pulse bag cleaning system simplifies the bag cleaning operation by eliminating the need for high pressure, high volume requirements of compressed air as used with pulse jet cleaning systems. The elimination of compressed air from the cleaning system also eliminates the ongoing maintenance requirement of the solenoid diaphragm valves needed to pulse each row of bags as well as the cost and maintenance of an air compressor. By eliminating the need for compressed air cleaning from the system, the danger of collected condensation within the air piping system that could freeze and damage piping is also eliminated. This is a common problem as many industrial applications operate in below freezing temperatures.

The up-draft pressure pulse cleaning system of the present invention is a simple yet efficient method of allowing the inertia of the exiting air flow in the clean air plenum to be momentarily stopped and then reversed on a selected compartment of bags creating a slight pressure pulse or reversal of flow in the bag. The momentary pulse or flow directional change is sufficient to allow the bag cloth to relax on the cage and alter its dynamic shape. The filter bags that are recommended for use with the present pressure pulse cleaning systems are slightly oversized to allow the bags to more easily change shape from tight online (under vacuum) shapes to relaxed offline shapes. The moment that the bag changes its dynamic shape (under vacuum shape) to a relaxed posture, the dust cake on the outside of the bag will drop off. The bag is then returned to normal operating vacuum and re-assumes its dynamic shape once again.

The clean air plenum contains a series of individual compartments that have a pre-set number of bags that can be effectively cleaned during each cycle. Each of these individual compartments has a door or louver located at the top of each plenum that is opened and closed during the cleaning cycle. An automatic control system continuously senses bag house pressure drop and activates the cycle when cleaning is required. The doors open and close in a pre-set pattern to drop the dust cakes from the bags and restore air flow to normal pressures.

When the bag house pressure drop is within the standard operating pressure range (approximately 2.0" wc to approximately 4.0" wc) the doors all remain fully open, allowing maximum filter flow. As the dust cake builds on the outside of the bags, the pressure drop will increase and when pressure exceeds preset limits the control system automatically activates the cleaning cycle. The cycle begins with a specific compartment and the door quickly closes on the bags in that specific compartment stopping and reversing flow instantly. The pressure pulse developed by this instantaneous blockage of airflow causes the bag to puff out and change its external shape, thereby dropping the dust cake. The door remains closed for 5 seconds and then is gradually opened and the cleaned bags are brought back on line. This cycle is repeated for each of the compartments until a full cleaning cycle is achieved. The automatic control then pauses to check the pressure drop and determine if the delta P has returned to normal range. If it has, the cleaning system stays at rest position with all doors open and all bags online. If the pressure is still elevated, the cleaning cycle will activate and the bags will again be cleaned.

It is the combination of the uniquely directed and controlled up-draft internal air flows within the vessel that eliminate re-circulation, along with the increased cleaning efficiency of the pressure pulse system that encompass the intent of this invention.

These and further and other objects and features of the invention are apparent in the disclosure, which includes the above and ongoing written specification, with the drawings.

BRIEF DESCRIPTION OF THE DRAWINGS

FIG. 3 is a top view of a filter bag and cage under vacuum.

FIG. 4 is a top view of a filter bag and cage in a relaxed atmospheric state.

DETAILED DESCRIPTION OF THE PREFERRED EMBODIMENTS

The present invention relates to the effective capture and removal of particulate material from dust laden air streams that must exit to atmosphere from many different process systems.

Figure 1:
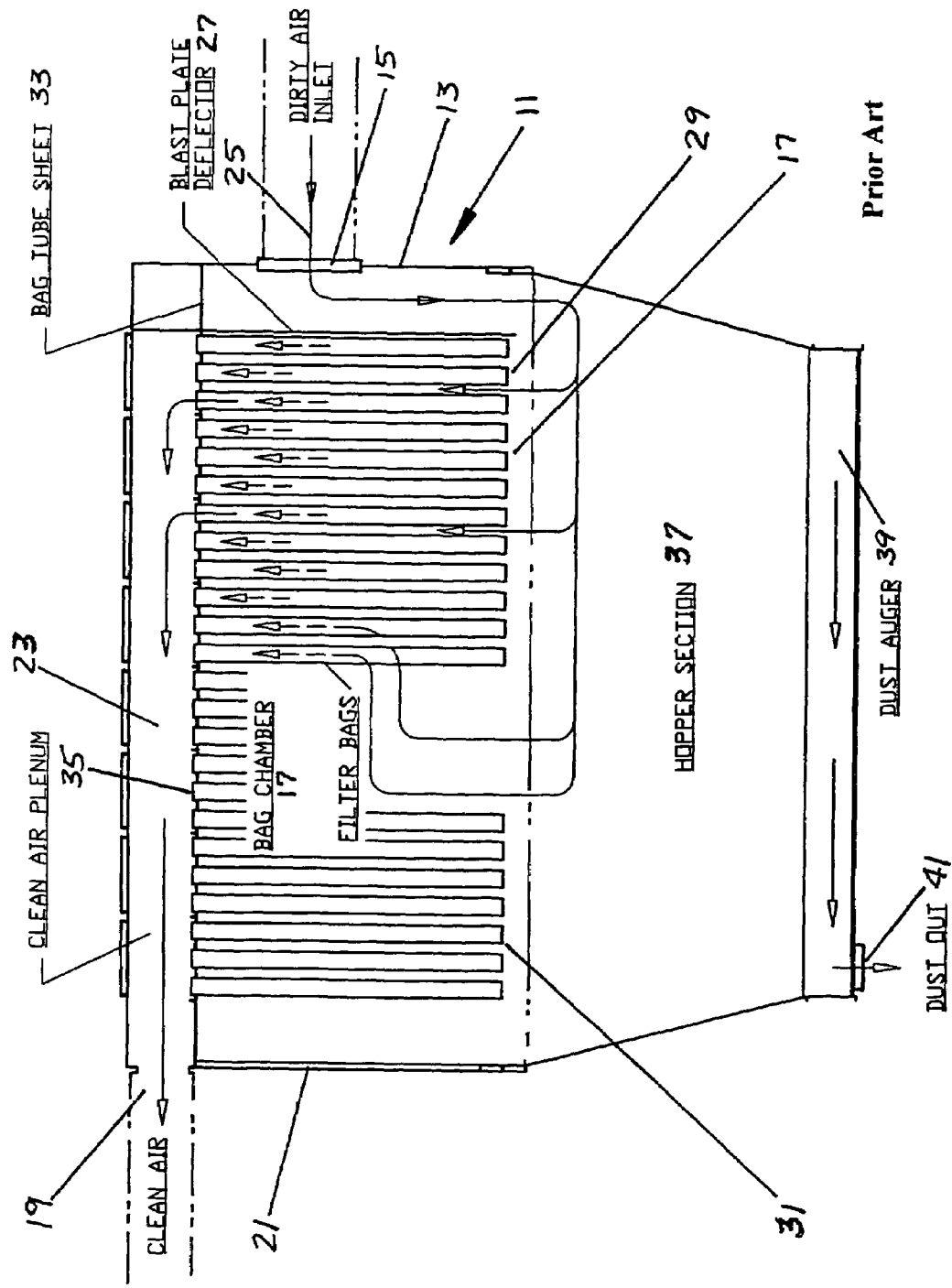
FIG. 1 is a side view of a typical bag house air filtration system.

FIG. 1 shows a typical bag house 11. A standard bag house 11 consists of a vessel 13, generally a rectangular container, having a dirty air inlet on one end 15 leading into a lower bag section 17 with a clean air outlet 19 on the other end 21 at the top leading from the upper clean air section 23. Incoming dirty air 25 is deflected downward into the bag chamber 17 of the bag house 11 by a blast deflector plate 27. The blast deflector plate 27 also protects bag filters 29 from being damaged by the force of the incoming dirty air 25. After the dirty air 25 enters the bag chamber 17, it must pass thorough a set of bag filters 29 in order to reach the clean air outlet 19.

The bag house 11 contains a multitude of bag filters 29. Each bag filter 29 consists of woven fabric bags 31 that can be of varying types and sizes (typically 6" diameter×12'0" long). The filter bags 31 are generally hung or mounted on a bag tube sheet 33 by a snap band collar 35 at the open end of the bag 31, which fits tightly into holes in the tube sheet 33 at the top of the bag section 17, thus providing air tight seals. Each fabric membrane bag 31 is fitted over a separate wire cage or extruded cage. The cages provide support for the bag filter 29 that allows the bag filter 29 to remain open and to assume a specific shape during cleaning operations. During cleaning, air flows inward through the bags, which are under a vacuum from the exhaust fan.

As the dirty air 25 passes through the filter bags 29, particulate material from the dirty air stream 25 is left on the outside of the cloth surface. As the dust accumulates and a dust cake forms on the outside of the bag, and the dust cake becomes the actual filtration membrane. As the dust cake thickness increases, the airflow resistance through the filter media also increases. When a certain level of pressure drop (delta P resistance) is reached, the dust cake must be reduced in order to restore adequate airflow to the system.

After a cleaning operation, the dust that is removed from the outer bag 31 surface drops by gravity to a hopper collection area 37 in the bottom of the bag house 11. The accumulated dust is then typically removed by a screw auger system 39 and exits the system 41.

Figure 2:
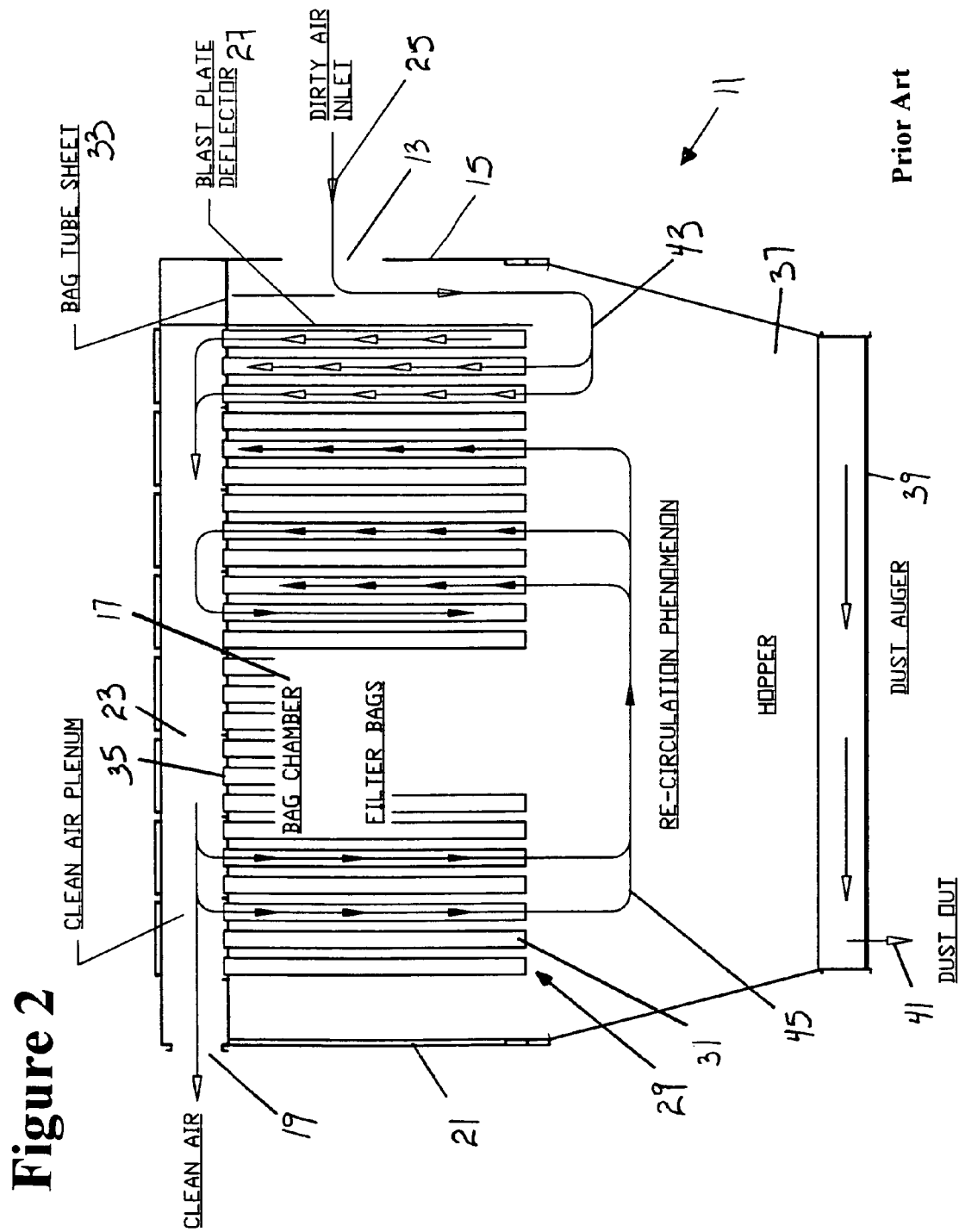
FIG. 2 is a side view of a typical bag house filtration system demonstrating undesired re-circulation.

Despite the widespread use of bag houses 11, traditional designs suffer from shortcomings. During the operation of a typical bag house 11, clean air is inadvertently recycled through the system. FIG. 2 shows a typical bag house 11 with improperly circulating air. Generally, cleaned air from the filter bags 29 does flow in the correct direction 43. However, studies have now proven that when the clean air from the bags passes through the clean air plenum 19 of the system, some of the clean air 45 is drawn back down into the filter bags 29 and passes through the filter bags 29 in the wrong direction. This creates a re-circulation problem that reduces the efficiency of the bag house 11.

The re-circulation phenomenon is further influenced by the relative position and configuration of inlet and outlet plenums and how they affect internal air flows, as well as the location, size and orientation of inlet blast plates.

FIGS. 3 and 4 show typical bag filters 47 used in existing bag houses 11 and in a new bag house 49 of the present invention. FIG. 3 shows a bag filter 47 while on line (under vacuum). The filter bag 47 consists of a wire frame, mesh, cage or other similar structure 51 with a bag 53 surrounding the wire frame 51. As the dirty air passes through the bag 53, dust is deposited on the outer surface of the bag 53 and forms a dust cake 55. This dust cake must be removed when the pressure drop between across the filter bag 47 becomes too great. FIG. 4 shows a bag filter 47 in a relaxed state at atmospheric pressure or during cleaning. The bag 53 expands from its vacuum state, thus shaking off the dust cake 55.

The present invention is a design and method of operation for a bag house structure with unique inlet and outlet plenum designs that affect internal airflow characteristics, as well as a unique design and functionality of a pressure pulse bag cleaning method.

Figure 5:
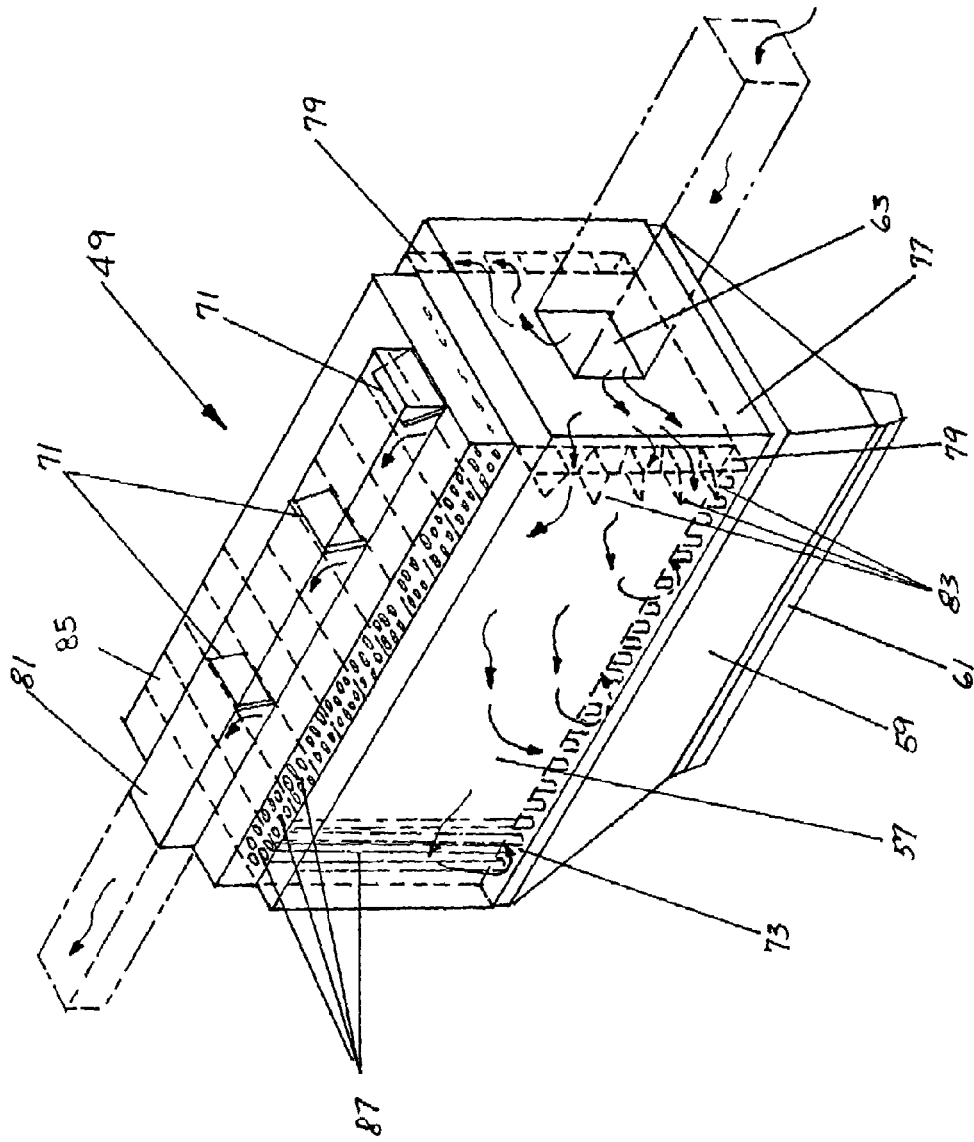
FIG. 5 is a perspective cutaway view of a new bag house with controlled internal airflow deflectors.

FIG. 5 shows a new bag house 49 in partial cutaway to reveal the inner structure of the bag house 49. In order to eliminate internal turbulence and stabilize pressures and flow pathways, the dirty air inlet plenums 79 must "straighten the air" and distribute the volume evenly throughout the hopper section 59 and bag section 57 of the house 49, eliminating turbulence and vortices. By entering at the center of a large (frontal entry) distribution chamber 77, inlet air duct 63 is directed to both right and left sides of the bag house 49 splitting the flow volume and allowing it to be evenly directed down and under the filter bags 73. A large inlet plenum 77 stabilizes inlet air pressure and also acts as a "primary knock out box collector" to capture and eliminate larger sized dust particulate from the air stream and deposit the material directly into the hopper 59. Dirty air enters into the distribution header 77 and is divided into two plenums 79 that enter the bag section 57 separately on each side of the bag house 49. Guide vanes 83 assist in distributing the flow uniformly through the plenums 79. Other modifications are possible to assist in improving flow distribution and reducing the velocity magnitude. After the dirty air stabilizes within the hopper 59 and bag section 57, it is evenly vacuumed up through the bags 73 into the clean air plenum 81. Dust removed from bags falls to the hopper 59, collecting in the screw conveyor 61 for removal.

The present invention is also a method of cleaning the new bag house 49. The pressure pulse cleaning system of the present invention is a simple yet efficient method of using the inertia of the exiting air flow in the clean air plenum to act as the pulse force by momentarily stopping and then reversing flow on a selected compartment of bags creating a pressure pulse or reversal of flow in the bag 73. The momentary pulse or flow directional change is sufficient to allow the bag cloth to relax on the cage and alter its shape. The filter bags that are recommended for use with the present pressure pulse cleaning systems are slightly oversized to allow the bags to more easily change shape from tight online (under vacuum) shapes to relaxed offline shapes. The moment that the bag changes its dynamic shape (under vacuum shape) the dust cake on the outside of the bag will drop off. The bag is then returned to normal operating vacuum and re-assumes its dynamic shape once again.

When the bag house pressure drop is within the standard operating pressure range (approximately 2.0" wc to approximately 4.0" wc) the doors 71 all remain fully open, allowing maximum flow. As the dust cake 55 builds on the outside of the bags 73, the pressure drop increases and when pressure exceeds preset limits the control system automatically activates the cleaning cycle. The cycle begins with a specific compartment and the door 71 quickly closes on the bags 73 and bag openings 87 in that specific compartment 85 stopping and reversing flow instantly. By mounting the pulse doors above the bag openings, a pressure pulse is developed by the instantaneous blockage of airflow, causing the bag 73 to relax and puff out, changing its external shape, and thereby dropping the dust cake 55. The door 71 remains closed for 5 seconds and then is gradually opened and the cleaned bags 73 are brought back on line. This cycle is repeated for each of the compartments until a full cleaning cycle is achieved. The automatic control then pauses to check the pressure drop and determine if the delta P has returned to normal range. If it has, the cleaning system stays at rest position all doors 71 open and all bags 73 online. If the pressure is still elevated, the cleaning cycle will activate and the bags 73 will again be cleaned.

Figure 6:
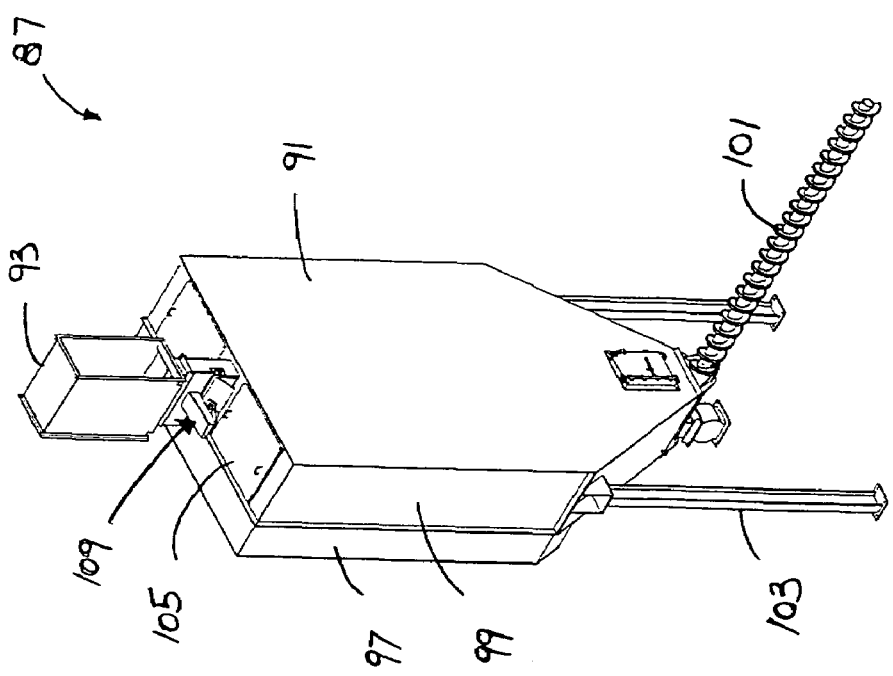
FIGS. 6 and 7 are isometric views of an inlet side of a single module showing inlet and outlet face plates with an up-draft pressure pulse cleaning system and a clean air exit duct.
Figure 7:
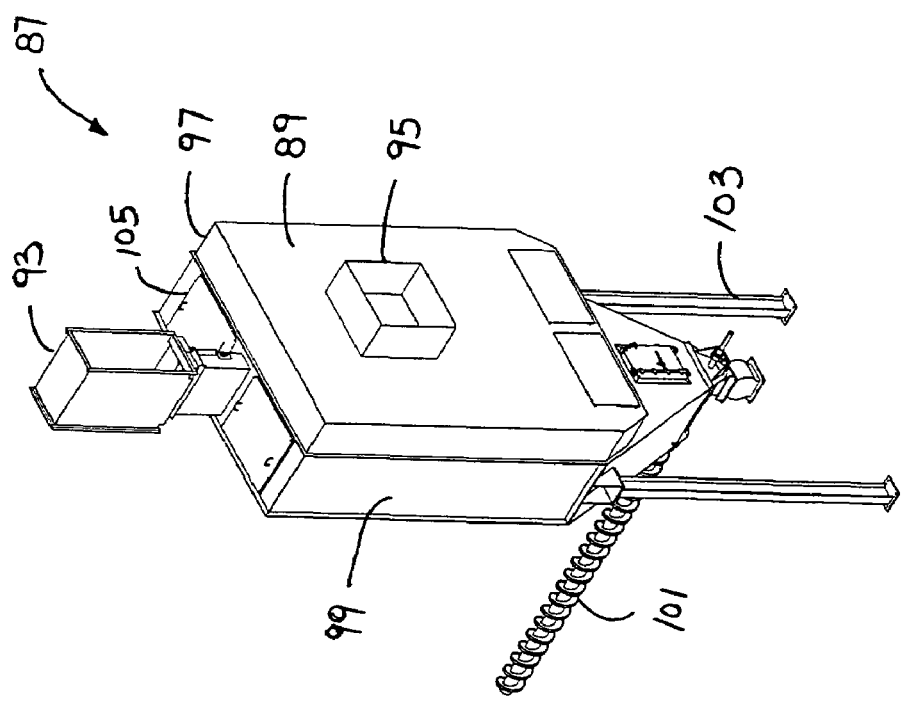
Figure 8:
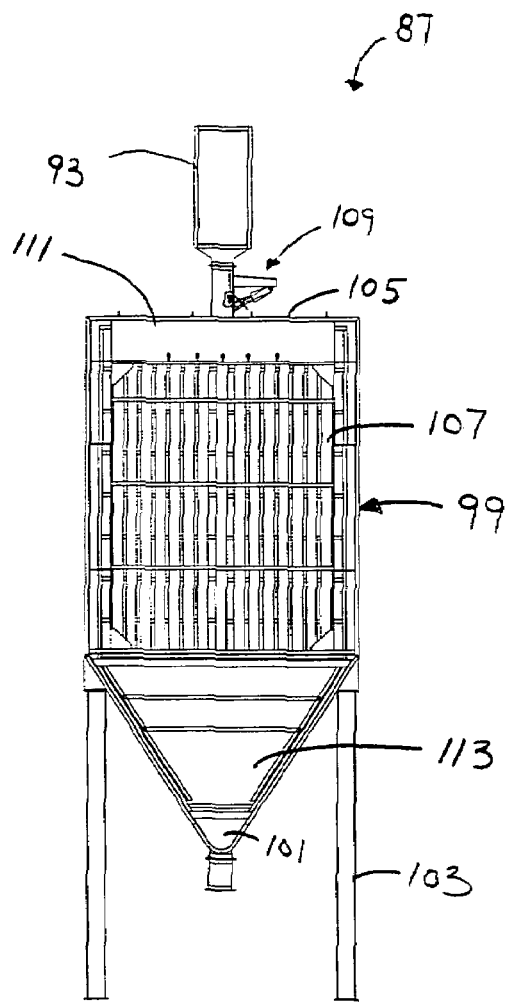
FIGS. 8 and 9 are elevation front and side views, respectively, of a typical module showing bags in a bag section with a clean air plenum and an up-draft pressure pulse system.

FIGS. 6 and 7 are isometric views of an inlet side of a single module 87 showing an inlet plate 89 and an outlet face plate 91 in an up-draft bag house with a pressure pulse cleaning system and a clean air exit duct 93. A dirty air inlet 95 allows dirty air into the module 87. The dirty air inlet 95 feeds into an inlet plenum 97, which then feeds into a bag section 99. Clean air exits from the clean air duct 93. Other parts of the system include a dust auger 101 and supports 103. Plates 105 on the top of the bag section 99 allow access to bags 107, as shown in FIG. 8. A pulse louver 109 moves to change airflow in the system.

Figure 9:
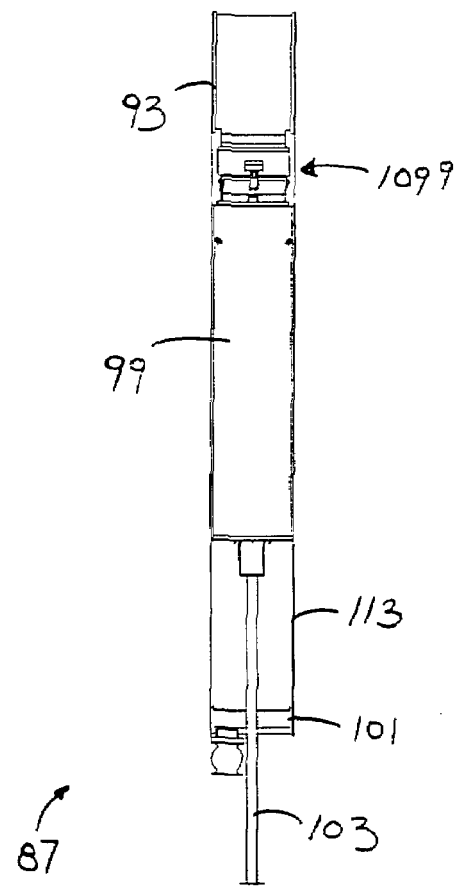

FIGS. 8 and 9 are elevational front inside and side views, respectively, of a typical module 87 showing bags 107 in a bag section 99 with a clean air plenum 111 in an up-draft bag house pressure pulse cleaning system. A hopper section 113 is located above the conveyor 101.

Figure 10:
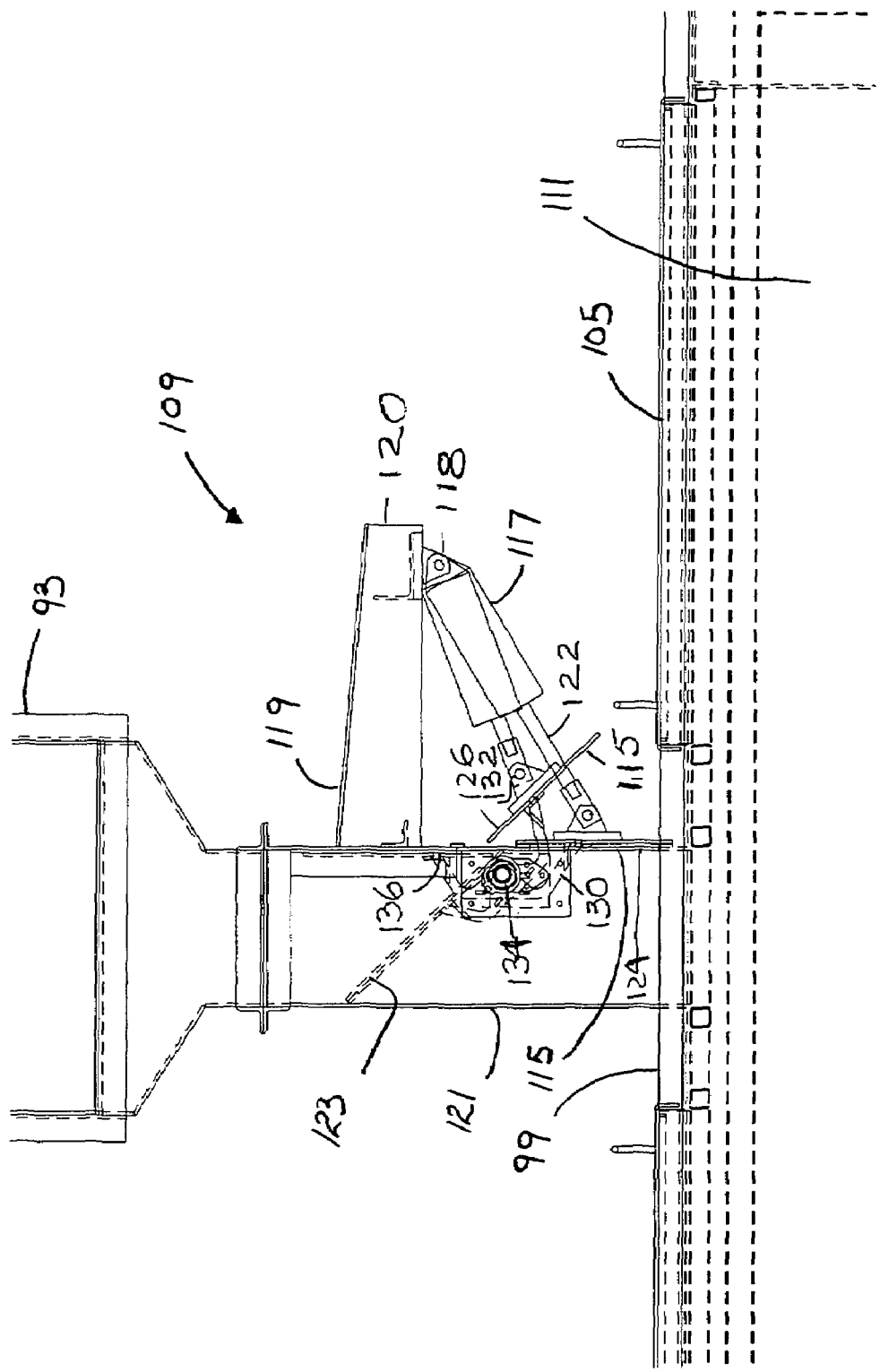
FIG. 10 is a detailed view showing the up-draft pressure pulse louver door and air cylinder in both closed and open positions.

FIG. 10 is a detailed view showing the up-draft bag house pressure pulse cleaning louver system 109. The louver system 109 is located on a neck 121 between the body of the bag section 99 and the clean air exit duct 93. The louver system 109 includes an air cylinder 117 attached to a pivot 118 on an outer end 120 of an extension 119. The pivoted air cylinder 117 moves a piston 122 and a door 115 from a closed position 124 while running to an open position 126 while cleaning. When in a cleaning position 124, a louver 123 is closed by a crank arm 130 connected to pivot 132 on door 115. The crank arm 130 is pivoted around bearing 134, which is mounted on the inside 136 of the vertical wall of the neck 121. In normal operation, the air cylinder 117 extends a piston 122 to close the door 115 and to open the louver 123. Periodically, to clean bags 107, the air cylinder temporarily pulls piston 122 to close louver 123 and to open the door 115 to supply an atmospheric pressure pulse to the inside of the bag.

Figure 11:
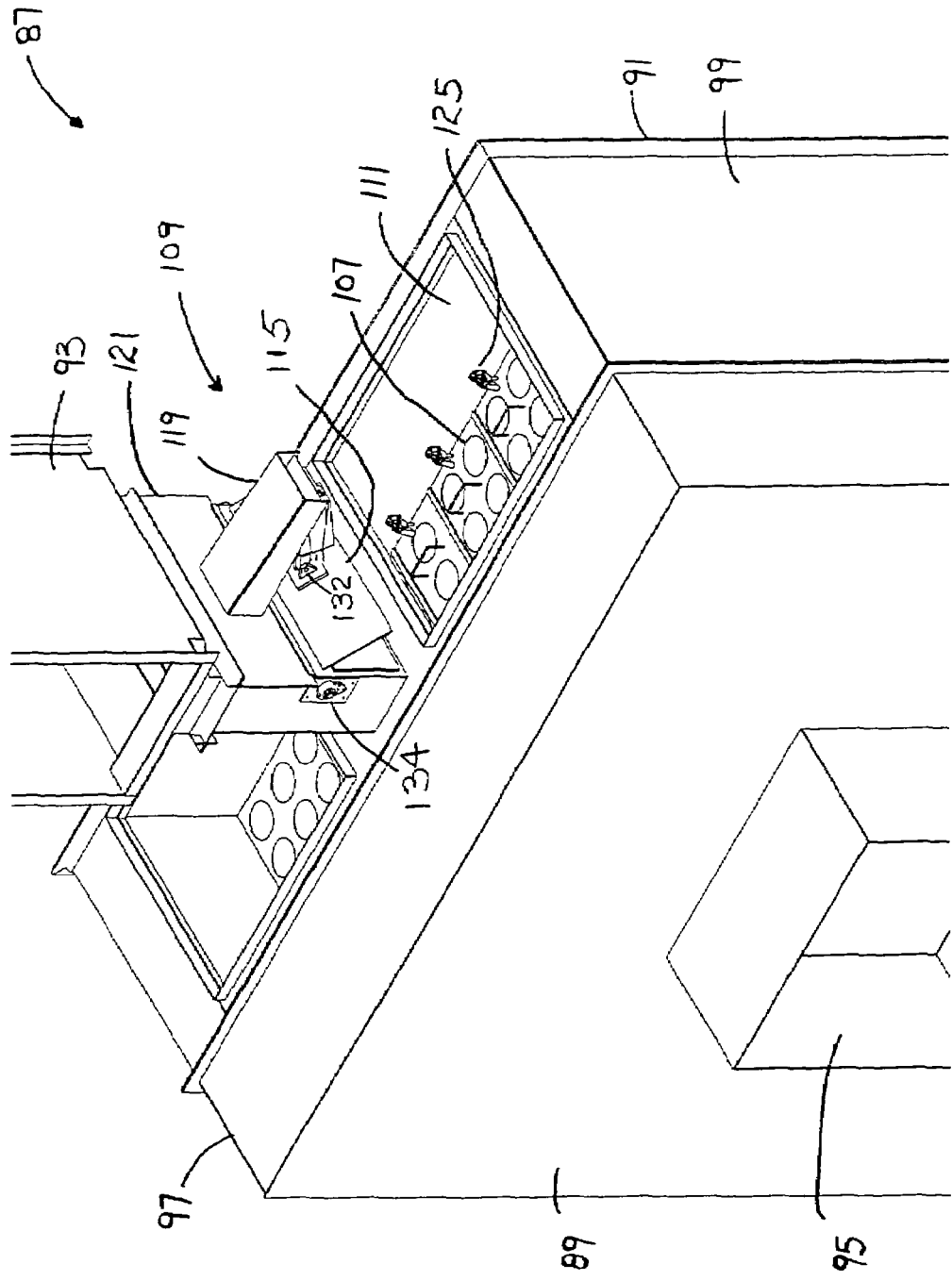
FIG. 11 is an isometric view of the top of a bag house module showing bags with tube sheet clamps and up-draft plenum to clean air exit duct.

FIG. 11 is an isometric view of the top of a bag house module 87 with lids 105 removed for showing bags 107 with tube sheet clamps 125 and up-draft plenum 111 to supply clean air exit duct 93 through the neck 121.

Figure 13:
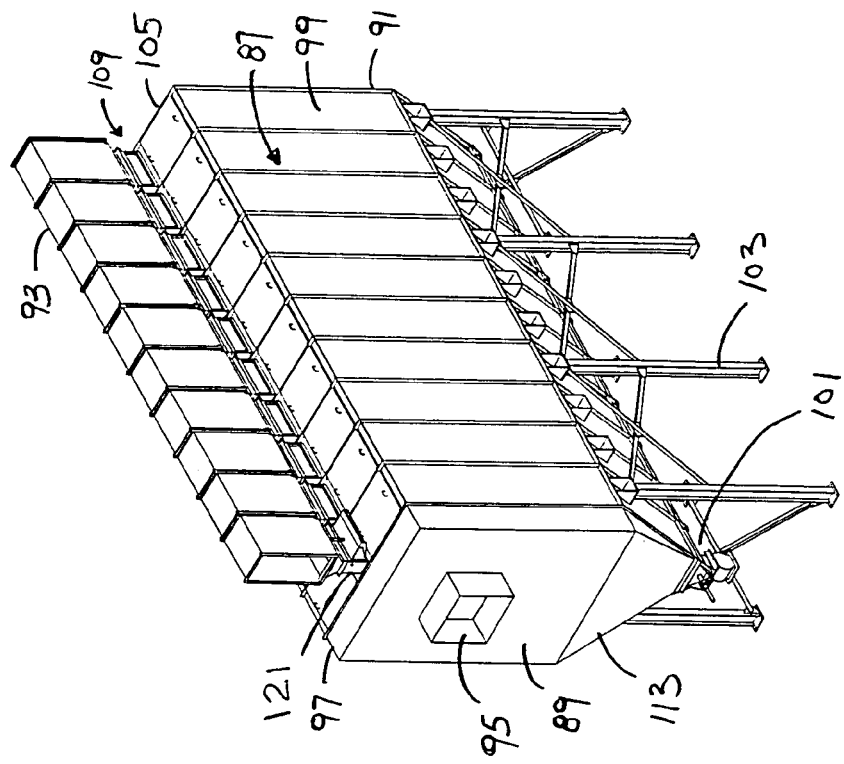
FIGS. 12 and 13 are isometric view of an up-draft pressure pulse bag house with a clean air duct.
Figure 12:
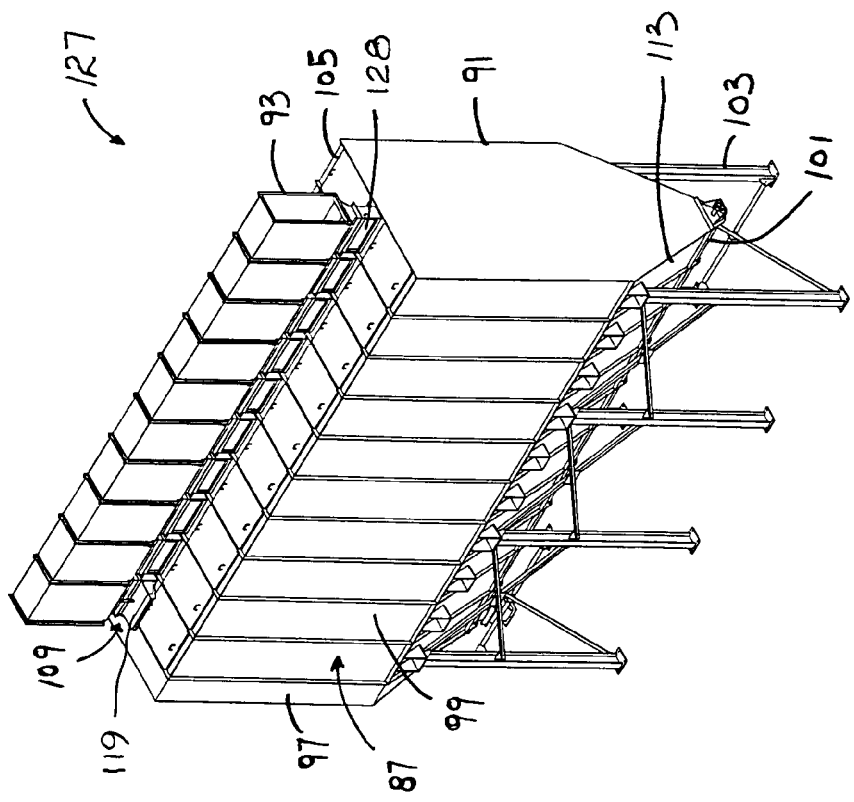

FIGS. 12 and 13 are, respectively, outlet and inlet end isometric views of a pressure pulse cleaned up-draft bag house 127 with a series of bag house modules 87 joined together with a clean air duct 93 form of a series of joined modules. One extension arm 119 is shown on the first module. The similar extension arm doors 115 and door and louver opening and closing mechanisms have been removed to sow the atmospheric vent openings 128 in modular necks 121, which are separately, periodically opened to pulse atmospheric pressure to the interiors of bags in single modules.

Figure 15:
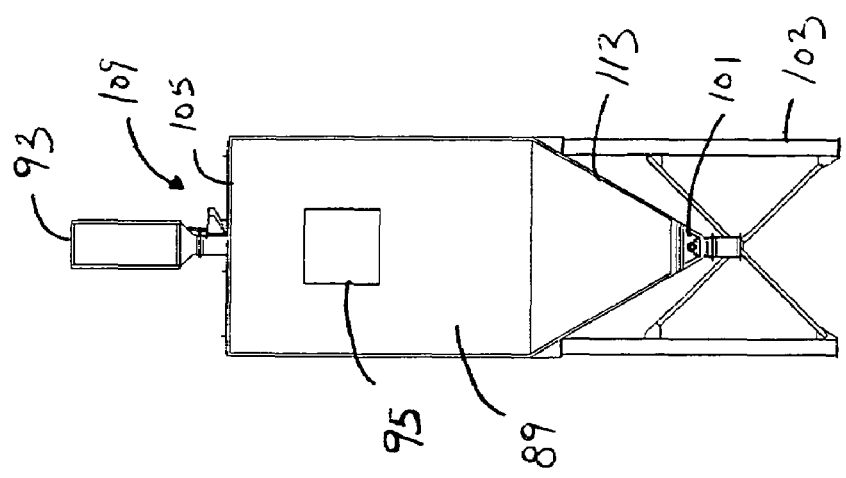
FIGS. 14 and 15 are elevation front and side views, respectively, of an up-draft pressure pulse bag house with a clean air duct.
Figure 14:
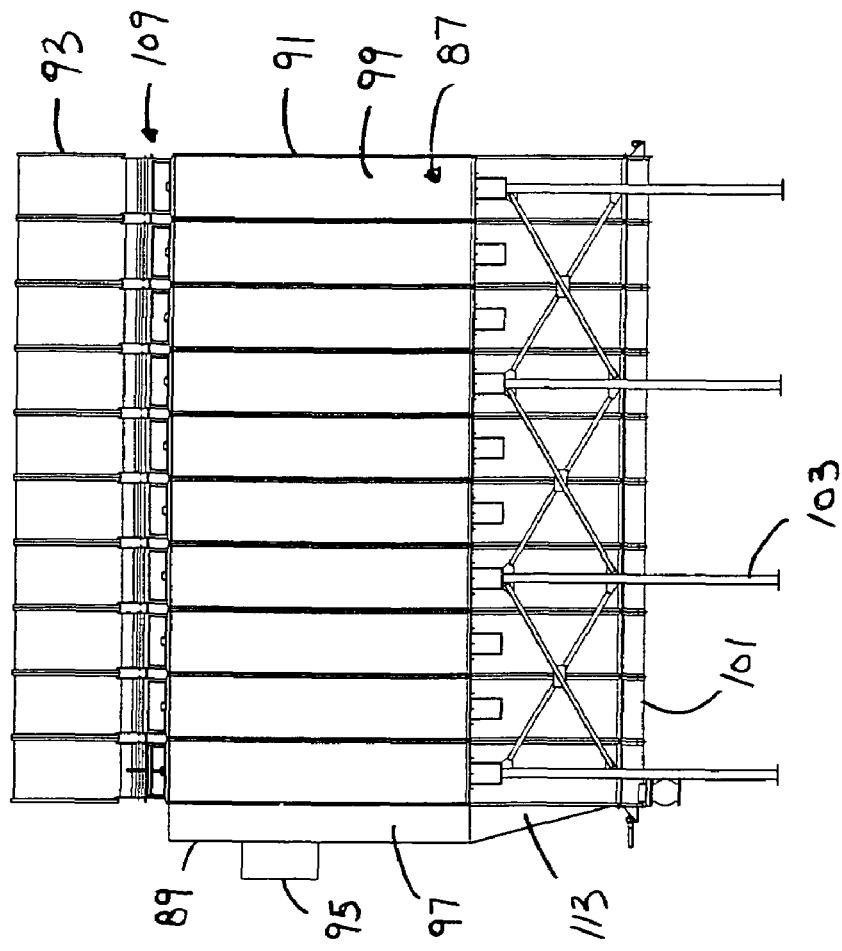

FIGS. 14 and 15 are right (extension arm) side and inlet end views, respectively, of a pressure pulse cleaned bag house 127 constructed with a series of joined bag house modules 87 and clean air duct 93 modules.

The combination of the uniquely directed and controlled internal air flows within the vessel eliminates re-circulation, along with the increased cleaning efficiency of the pressure pulse system that encompass the intent of this invention.

While the invention has been described with reference to specific embodiments, modifications and variations of the invention may be constructed without departing from the scope of the invention.

The invention claimed is:

1. An up-draft bag house apparatus with pressure pulse cleaning comprising:
    a dirty air inlet on an inlet face plate,
    an outlet face plate,
    an inlet plenum connected to the dirty air inlet,
    a hopper region connected to the inlet plenum for collecting particulate matter,
    a screw conveyor at the base of the hopper region for removing the collected particulate matter from the hopper region,
    one or more bags in a bag region connected to the hopper region,
    a clean air plenum connected to the bag region,
    one or more louver and door closure systems connected to the clean air plenum for controlling flow of air through the one or more bags,
    wherein one or more louvers and one or more doors allow passage of air from the clean air plenum while operating the up-draft bag house and prevent passage of air from the clean air plenum while cleaning the up-draft bag house,
    wherein the one or more louvers and one or more doors are opened and closed periodically for cleaning the one or more bags, and
    an clean air exit duct connected to the one or more louver and door systems for exhausting clean air.

2. The apparatus of claim 1, wherein two or more individual up-draft bag houses are connected in series for increasing capacity of the up-draft bag house, and wherein the combined individual up-draft bag house uses one inlet face plate on the inlet end of the combined individual up-draft bag house and one outlet face plate on the outlet end of the combined individual up-draft bag house.

3. The apparatus of claim 2, wherein the individual up-draft bag houses are interchangeable.

4. The apparatus of claim 2, wherein the one or more louvers and one or more doors on each individual up-draft bag house are opened and closed in sequence during a cleaning cycle.

5. The apparatus of claim 1, wherein particulate material is removed from the dirty air by gravity upon entering the inlet plenum and guided to the hopper region.

6. The apparatus of claim 1, wherein air from the dirty air inlet is split into two plenums on either side of the bag region.

7. The apparatus of claim 1, further comprising guide vanes for creating favorable velocity profiles.

8. The apparatus of claim 1, further comprising a sensor for detecting pressure drops across the one or more bags.

9. The apparatus of claim 1, wherein the louver and door system further comprises an air cylinder actuator.

10. The apparatus of claim 1, wherein during operation of the up-draft bag house the louver is positioned flush with a neck between the clean air plenum and exit duct and the door is flush with and covers an opening in the neck, and wherein during cleaning the louver is positioned across the neck and the door is pulled away from the opening for venting the neck to atmosphere.

11. An up-draft pressure pulse bag house cleaning method comprising:
    providing dirty air into a dirty air inlet,
    flowing the dirty air from the dirty air inlet into an inlet plenum, then into a hopper region, and then through one or more bags in a bag region,
    removing particulate matter from the dirty air in the bag region and feeding the particulate matter into the hopper,
    removing particulate matter from the hopper with a screw auger,
    flowing clean air from the one or more bags into a clean air plenum,
    exhausting the clean air from the clean air plenum into a clean air exhaust duct,
    cleaning the up-draft pressure pulse bag house by periodically closing one or more louvers and opening one or more doors in one or more louver and door systems connected to the clean air plenum for temporarily blocking the flow of air through the exhaust duct and venting the clean air plenum to atmosphere, and
    resuming normal operation by opening the one or more louvers and closing the one or more doors in the one or more louver systems.

12. The method of claim 11, further comprising increasing capacity of the up-draft bag house by combining two or more individual up-draft bag houses in series, and further comprising using only one inlet face plate on the inlet end of the combined individual up-draft bag house and one outlet face plate on the outlet end of the combined individual up-draft bag house.

13. The method of claim 12, wherein the individual up-draft bag houses are interchangeable.

14. The method of claim 12, further comprising opening and closing the one or more louvers and one or more doors on each individual up-draft bag house in sequence during a cleaning cycle.

15. The method of claim 11, further comprising removing particulate matter from the dirty air by gravity upon entering the inlet plenum and guiding the particulate matter to the hopper region.

16. The method of claim 11, further comprising splitting air from the dirty air inlet into two plenums on either side of the bag region.

17. The method of claim 11, further comprising creating favorable velocity profiles with guide vanes.

18. The method of claim 11, further comprising detecting pressure drops across the one or more bags with a sensor.

19. The method of claim 11, wherein the closing the one or more louvers for blocking airflow through the exhaust duct and opening the one or more doors for venting the clean air plenum to atmosphere creates a pulse force that changes the shape of the one or more bags and knocks the particulate matter off of the one or more bags.

20. An up-draft bag house apparatus with pressure pulse cleaning comprising:
    a dirty air inlet on an inlet face plate,
    an inlet plenum connected to the dirty air inlet for controlling the velocity of the dirty air and removing large particulate matter from the dirty air,
    a screw auger for removing particulate matter,
    one or more modular bag houses connected in series, each modular bag house comprising:
    a hopper region,
    a bag region with one or more bags connected to the hopper region,
    a clean air plenum connected to the bag region,
    a louver and door system on a neck connecting the clean air plenum to a clean air exit duct further comprising a door for covering and uncovering an opening in the neck, a louver for blocking and unblocking airflow through the neck, and an actuator for opening and closing the louver and the door, and an outlet face plate.

* * * * *